US012641519B2

(12) United States Patent (10) Patent No.: US 12,641,519 B2
Anami (45) Date of Patent: May 26, 2026

(54) COMMUNICATION SYSTEM, COMMUNICATION CONTROL METHOD, AND NON-TRANSITORY COMPUTER READABLE STORAGE MEDIUM

(71) Applicant: NEC Corporation, Tokyo (JP)

(72) Inventor: Shinichi Anami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 297 days.

(21) Appl. No.: 18/544,703

(22) Filed: Dec. 19, 2023

(65) Prior Publication Data

US 2024/0214907 A1     Jun. 27, 2024

(30) Foreign Application Priority Data

Dec. 27, 2022     (JP) ................................. 2022-209456

(51) Int. Cl.
*H04W 40/28*        (2009.01)
*H04L 45/00*        (2022.01)
*H04W 40/36*        (2009.01)

(52) U.S. Cl.
CPC ............. *H04W 40/36* (2013.01); *H04L 45/22* (2013.01); *H04W 40/28* (2013.01)

(58) Field of Classification Search
CPC ........ H04W 40/36; H04W 40/28; H04L 45/22
USPC ........................................................ 370/329
See application file for complete search history.

(56) References Cited

U.S. PATENT DOCUMENTS

| 2003/0088698 A1* | 5/2003 | Singh | .................. H04L 12/4641 |
| | | | 709/239 |
| 2004/0215752 A1* | 10/2004 | Satapati | .............. H04L 67/1001 |
| | | | 709/223 |
| 2005/0002405 A1* | 1/2005 | Gao | ................... H04N 21/6405 |
| | | | 375/E7.025 |
| 2005/0025179 A1* | 2/2005 | McLaggan | .............. H04L 45/38 |
| | | | 370/468 |
| 2005/0073998 A1* | 4/2005 | Zhu | ........................ H04L 65/103 |
| | | | 370/352 |
| 2005/0259669 A1* | 11/2005 | Ozu | .................... H04L 41/0631 |
| | | | 370/401 |
| 2006/0233183 A1* | 10/2006 | Soncodi | ................ H04L 47/785 |
| | | | 370/401 |
| 2007/0121617 A1* | 5/2007 | Kanekar | ............. H04L 12/4641 |
| | | | 370/389 |
| 2009/0073993 A1* | 3/2009 | Qureshi | .................. H04L 45/04 |
| | | | 370/401 |

(Continued)

FOREIGN PATENT DOCUMENTS

JP          2016-136749 A       7/2016

*Primary Examiner* — Mark G. Pannell
(74) *Attorney, Agent, or Firm* — Sughrue Mion, PLLC

(57)                ABSTRACT
A communication control device detects occurrence of a failure in a gateway and generates, when occurrence of the failure in the gateway has been detected and a client-side communication interface of a communication control device has received first communication data from one of a plurality of server-side communication interfaces included in a communication device, path information for defining a communication path of second communication data to be transmitted from the communication control device to a server-side communication interface of a communication device having transmitted the first communication data, and transmits the second communication data based on the path information.

15 Claims, 9 Drawing Sheets

(56)                References Cited

U.S. PATENT DOCUMENTS

| | | | | |
|---|---|---|---|---|
| 2009/0086743 A1* | 4/2009 | Veits | H04L 45/586 | 370/401 |
| 2009/0279516 A1* | 11/2009 | Kok | H04W 24/04 | 370/352 |
| 2011/0103393 A1* | 5/2011 | Meier | H04L 67/1014 | 370/401 |
| 2011/0131645 A1* | 6/2011 | Johnson | G06F 11/0709 | 709/239 |
| 2011/0258433 A1* | 10/2011 | Pulini | H04L 63/20 | 713/153 |
| 2011/0320577 A1* | 12/2011 | Bhat | H04L 45/586 | 709/222 |
| 2012/0084449 A1* | 4/2012 | Delos Reyes | H04W 12/062 | 709/229 |
| 2012/0134259 A1* | 5/2012 | Bonnier | H04L 41/0668 | 370/328 |
| 2012/0239966 A1* | 9/2012 | Kompella | H04W 24/04 | 714/E11.073 |
| 2013/0036451 A1* | 2/2013 | Fausak | H04L 69/329 | 726/3 |
| 2013/0142201 A1* | 6/2013 | Kim | H04L 12/4645 | 370/392 |
| 2013/0301413 A1* | 11/2013 | Moen | H04L 67/1001 | 370/235 |
| 2014/0280969 A1* | 9/2014 | Wood | H04L 67/02 | 709/226 |
| 2018/0262348 A1* | 9/2018 | Golshan | H04L 9/0838 | |
| 2019/0327312 A1* | 10/2019 | Gupta | H04L 67/148 | |
| 2020/0287819 A1* | 9/2020 | Theogaraj | H04L 47/822 | |
| 2020/0389817 A1* | 12/2020 | Bhatnagar | H04L 67/1008 | |
| 2021/0083944 A1* | 3/2021 | T | H04L 41/0668 | |
| 2021/0152495 A1* | 5/2021 | Craig | H04L 43/08 | |
| 2021/0385155 A1* | 12/2021 | Suryanarayana | H04L 45/64 | |
| 2022/0247725 A1* | 8/2022 | Panchamia | H04L 12/4633 | |

* cited by examiner

| IDENTIFICATION INFORMATION OF FIRST GATEWAY | COMMUNICATION STATUS | STATE OF PATH INFORMATION |
|---|---|---|
| gateway01 | NORMAL | – |
| gateway02 | NORMAL | – |
| gateway03 | STOP | UNDETERMINED |
| gateway04 | NORMAL | – |
| ⋮ | ⋮ | ⋮ |

Fig. 4

| No | TRANSMISSION SOURCE OF PACKET | DESTINATION OF PACKET | INPUT IF OF GATEWAY | OUTPUT IF OF GATEWAY |
|---|---|---|---|---|
| 1 | 192.168.2.100 (SERVER 2) | 192.168.2.101 (MOBILE DEVICE 6A) | 192.168.2.10 (SERVER-SIDE COMMUNICATION IF) | 192.168.0.10 (CLIENT-SIDE COMMUNICATION IF) ※BY WAY OF Tunnel 0.1 |
| 2 | 192.168.2.100 (SERVER 2) | 192.168.2.255 ※BROADCAST | 192.168.2.10 (SERVER-SIDE COMMUNICATION IF) | 192.168.0.10 192.168.1.10 (BOTH CLIENT-SIDE COMMUNICATION IFs) |
| 3 | 192.168.2.101 (MOBILE DEVICE 6A) | 192.168.2.100 (SERVER 2) | 192.168.0.10 (CLIENT-SIDE COMMUNICATION IF) ※BY WAY OF Tunnel 0.1 | 192.168.2.10 (SERVER-SIDE COMMUNICATION IF) |
| ... | | | ... | |

Fig. 5

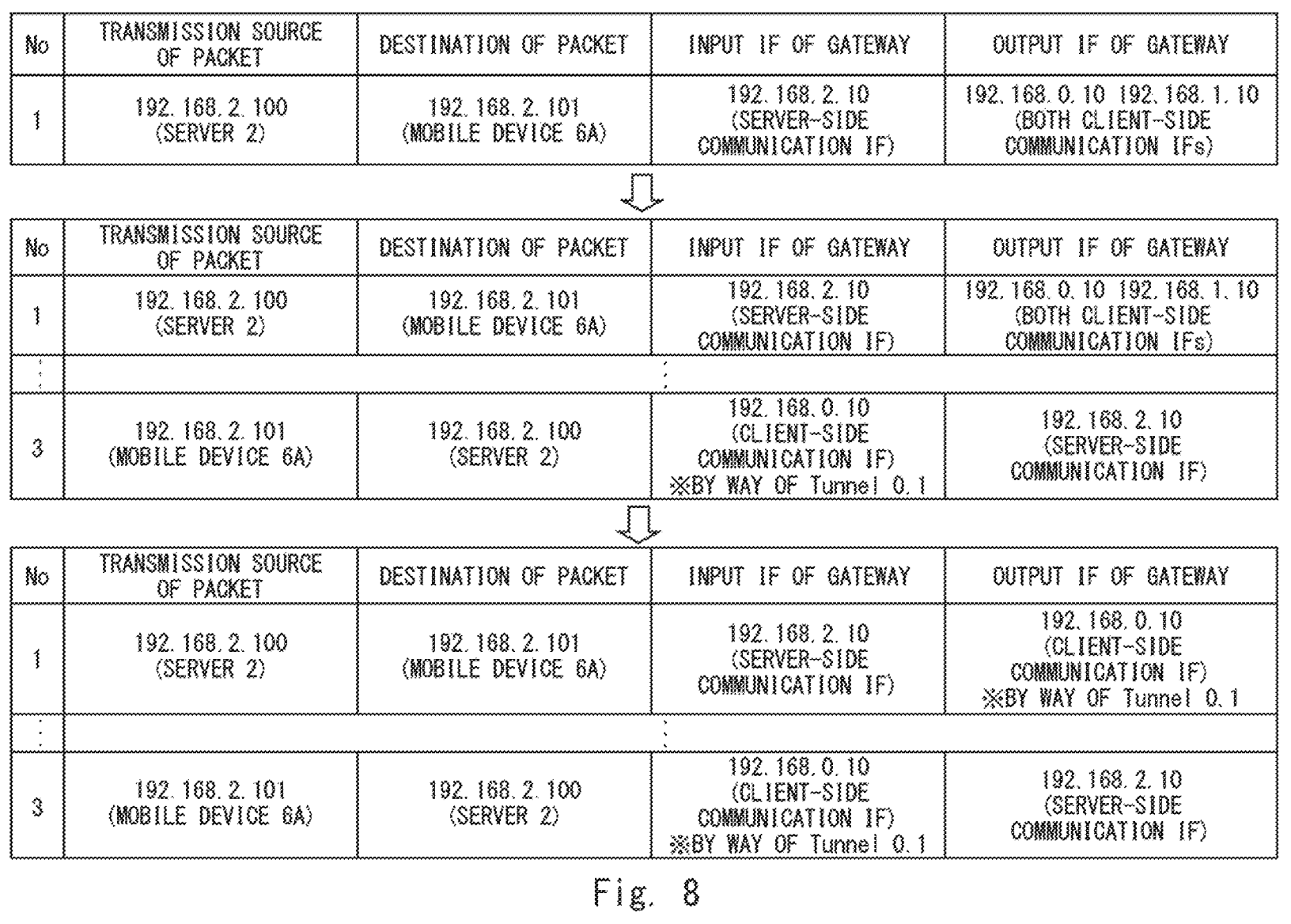

| No | TRANSMISSION SOURCE OF PACKET | DESTINATION OF PACKET | INPUT IF OF GATEWAY | OUTPUT IF OF GATEWAY |
|----|-------------------------------|-----------------------|---------------------|----------------------|
| 1 | 192.168.2.100 (SERVER 2) | 192.168.2.101 (MOBILE DEVICE 6A) | 192.168.2.10 (SERVER-SIDE COMMUNICATION IF) | 192.168.0.10 192.168.1.10 (BOTH CLIENT-SIDE COMMUNICATION IFs) |

⇨

| No | TRANSMISSION SOURCE OF PACKET | DESTINATION OF PACKET | INPUT IF OF GATEWAY | OUTPUT IF OF GATEWAY |
|----|-------------------------------|-----------------------|---------------------|----------------------|
| 1 | 192.168.2.100 (SERVER 2) | 192.168.2.101 (MOBILE DEVICE 6A) | 192.168.2.10 (SERVER-SIDE COMMUNICATION IF) | 192.168.0.10 192.168.1.10 (BOTH CLIENT-SIDE COMMUNICATION IFs) |
| ... | | | | |
| 3 | 192.168.2.101 (MOBILE DEVICE 6A) | 192.168.2.100 (SERVER 2) | 192.168.0.10 (CLIENT-SIDE COMMUNICATION IF) ※BY WAY OF Tunnel 0.1 | 192.168.2.10 (SERVER-SIDE COMMUNICATION IF) |

⇨

| No | TRANSMISSION SOURCE OF PACKET | DESTINATION OF PACKET | INPUT IF OF GATEWAY | OUTPUT IF OF GATEWAY |
|----|-------------------------------|-----------------------|---------------------|----------------------|
| 1 | 192.168.2.100 (SERVER 2) | 192.168.2.101 (MOBILE DEVICE 6A) | 192.168.2.10 (SERVER-SIDE COMMUNICATION IF) | 192.168.0.10 (CLIENT-SIDE COMMUNICATION IF) ※BY WAY OF Tunnel 0.1 |
| ... | | | | |
| 3 | 192.168.2.101 (MOBILE DEVICE 6A) | 192.168.2.100 (SERVER 2) | 192.168.0.10 (CLIENT-SIDE COMMUNICATION IF) ※BY WAY OF Tunnel 0.1 | 192.168.2.10 (SERVER-SIDE COMMUNICATION IF) |

Fig. 8

COMMUNICATION SYSTEM, COMMUNICATION CONTROL METHOD, AND NON-TRANSITORY COMPUTER READABLE STORAGE MEDIUM

INCORPORATION BY REFERENCE

This application is based upon and claims the benefit of priority from Japanese patent application No. 2022-209456, filed on Dec. 27, 2022, the disclosure of which is incorporated herein in its entirety by reference.

TECHNICAL FIELD

The present disclosure relates to a communication system including a gateway, a communication control device, a communication control method, and a communication control program.

BACKGROUND ART

Various techniques for preventing a communication failure in a communication system including a gateway have been proposed. As one example of the aforementioned techniques, in a system disclosed in Japanese Unexamined Patent Application Publication No. 2016-136749, when one of a plurality of active devices has stopped communication processing, another active device performs this processing.

SUMMARY

There is also a technique in which, when a communication device includes a plurality of communication interfaces in a communication system including the communication device, one of these communication interfaces whose communication state is good is selected and used. However, in the system disclosed in the above literature, a backup device of a gateway in which a failure has occurred is not used to perform data communication via a communication interface used before the failure occurs, from among the plurality of communication interfaces included in the communication device. Therefore, in the system disclosed in the above literature, it is possible that a communication interface used before the failure occurs, the communication state of which is good, may not be used, and thus a communication failure may occur in a case where a failure occurs in a gateway.

The present disclosure has been made in view of the aforementioned problem, and one of the objects of the present disclosure is to provide a communication system, a communication control device, a communication control method, and a communication control program capable of preventing a communication failure from occurring when a failure occurs in a gateway in the communication system.

A communication system according to one illustrative example embodiment includes: at least one first gateway including a server-side communication interface and at least one client-side communication interface; a second gateway that includes a server-side communication interface and at least one client-side communication interface and functions as a backup device of the at least one first gateway; and a plurality of communication devices that include a plurality of server-side communication interfaces and a client-side communication interface and communicate with the first gateway and the second gateway, in which the plurality of communication devices are provided in respective mobile devices which are clients, a plurality of IP addresses are allocated to the client-side communication interfaces of the first gateway and the second gateway, which allocation allows the client-side communication interfaces to function as a plurality of client-side communication interfaces, the second gateway includes: at least one memory storing at least one instruction; and at least one processor configured to process the instructions to: detect occurrence of a failure in the first gateway; generate, when occurrence of a failure in the first gateway has been detected and the client-side communication interface of the second gateway has received first communication data from one of the plurality of server-side communication interfaces of the communication device, path information for defining a communication path of second communication data transmitted from the client-side communication interface of the second gateway having received the first communication data; and transmit, based on the path information, the second communication data from the client-side communication interface having received the first communication data to the server-side communication interface of the communication device having transmitted the first communication data, in which the path information defines, from among the plurality of client-side communication interfaces of the second gateway, the client-side communication interface having received the first communication data as an interface that transmits the second communication data.

A communication control device that functions as a backup device of one or more gateways according to one illustrative example embodiment includes: a server-side communication interface and at least one client-side communication interface that communicates with a plurality of communication devices provided in a plurality of respective mobile devices which are clients, a plurality of IP addresses are allocated to the client-side communication interface, which allocation allows the client-side communication interface to function as a plurality of client-side communication interfaces, the communication control device includes: at least one memory storing at least one instruction; and at least one processor configured to process the instructions to: detect occurrence of a failure in the gateway; generate, when occurrence of a failure in the gateway has been detected and the client-side communication interface has received first communication data from one of a plurality of server-side communication interfaces included in the communication device, path information for defining a communication path of second communication data transmitted from the client-side communication interface of the communication control device having received the first communication data; and transmit, based on the path information, the second communication data from the client-side communication interface having received the first communication data to the server-side communication interface of the communication device having transmitted the first communication data, in which the path information defines one of the plurality of client-side communication interfaces of the communication control device having received the first communication data as an interface that transmits the second communication data.

In a communication control method executed by a processor included in a communication control device that functions as a backup device of one or more gateways according to one illustrative example embodiment, the communication control device includes a server-side communication interface and at least one client-side communication interface that communicates with a plurality of communication devices provided in a plurality of respective mobile devices which are clients, a plurality of IP addresses are allocated to the client-side communication interface, which allocation allows the client-side communication interface to function as a plurality of client-side communication interfaces, the communication control method causes the processor to: determine whether occurrence of a failure in the gateway has been detected, generate, when occurrence of a failure in the gateway has been detected and the client-side communication interface has received first communication data from one of a plurality of server-side communication interfaces included in the communication device, path information for defining a communication path of second communication data transmitted from the client-side communication interface of the communication control device having received the first communication data; and transmit, based on the path information, the second communication data from the client-side communication interface having received the first communication data to the server-side communication interface of the communication device having transmitted the first communication data, and the path information defines one of the plurality of client-side communication interfaces of the communication control device having received the first communication data as an interface that transmits the second communication data.

In a non-transitory computer readable storage medium storing a communication control program executed by a communication control device that functions as a backup device of one or more gateways according to one illustrative example embodiment, the communication control device includes a server-side communication interface and at least one client-side communication interface that communicates with a plurality of communication devices provided in a plurality of respective mobile devices which are clients, a plurality of IP addresses are allocated to the client-side communication interface, which allocation allows the client-side communication interface to function as a plurality of client-side communication interfaces, the program causes the processor included in the communication control device to: determine whether occurrence of a failure in the gateway has been detected; generate, when occurrence of a failure in the gateway has been detected and the client-side communication interface has received first communication data from one of a plurality of server-side communication interfaces included in the communication device, path information for defining a communication path of second communication data transmitted from the client-side communication interface of the communication control device having received the first communication data; and transmit, based on the path information, the second communication data from the client-side communication interface having received the first communication data to the server-side communication interface of the communication device having transmitted the first communication data, and the path information defines one of the plurality of client-side communication interfaces of the communication control device having received the first communication data as an interface that transmits the second communication data.

BRIEF DESCRIPTION OF DRAWINGS

FIG. 4 is a diagram showing one example of a gateway management table;

FIG. 5 is a diagram showing one example of a path information table;

FIG. 8 is a diagram showing a method for generating path information;

EXAMPLE EMBODIMENT

Figure 1:
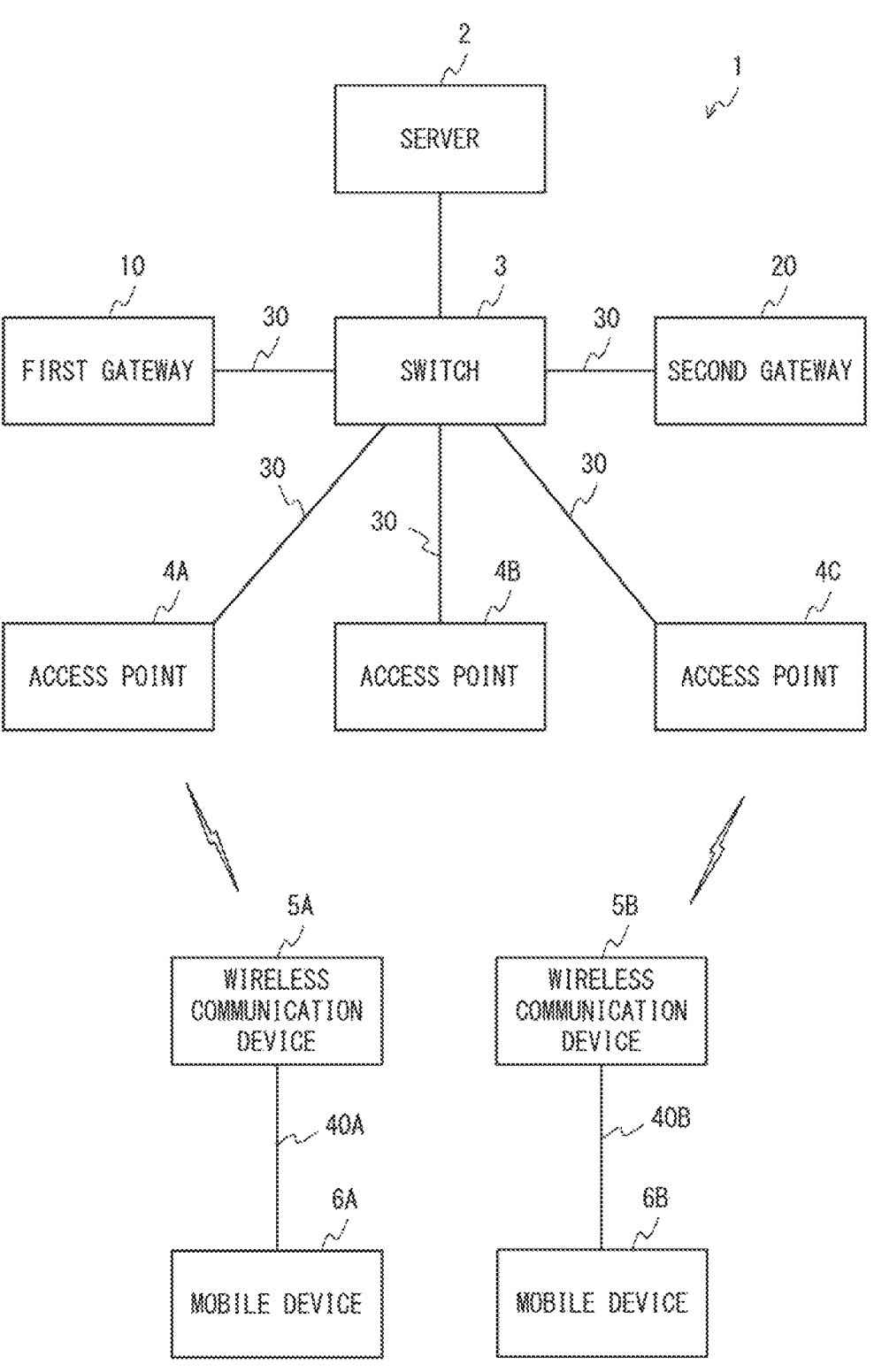
FIG. 1 is a diagram showing a communication system according to one illustrative example embodiment.

Hereinafter, with reference to the drawings, one illustrative example embodiment will be described. FIG. 1 is a schematic view showing a communication system 1 according to one illustrative example embodiment. The communication system 1 includes a server 2, a switch 3, a first gateway 10, a second gateway 20, access points 4A-4C, wireless communication devices 5A and 5B, and mobile devices 6A and 6B. Note that the communication system 1 may include a desired number of first gateways 10, wireless communication devices 5A and 5B, and mobile devices 6A and 6B. Further, in another example embodiment, in place of the wireless communication devices 5A and 5B, wired communication devices may be employed.

The server 2 is a device that processes various kinds of information regarding the mobile devices 6A and 6B, which are clients. For example, the server 2 can transmit control data to the mobile devices 6A and 6B and control operations of the mobile devices 6A and 6B. Further, the server 2 can acquire various kinds of data from the mobile devices 6A and 6B.

The switch 3 is a device that connects a network formed of a network cable 30 to a network on the side of the server 2.

The first gateway 10 is a communication control device that relays communication data between the network formed of the network cable 30 and the network on the side of the server 2. The first gateway 10 corresponds to a master gateway. The first gateway 10 may include one physical server-side communication interface and one physical client-side communication interface. The first gateway 10 performs data communication with the server 2 via the server-side communication interface. The server-side communication interface of the first gateway 10 may also be referred to as a bridge interface.

Further, the first gateway 10 performs data communication with the access points 4A-4C and the wireless communication devices 5A and 5B via the client-side communication interface. IP addresses are allocated to the physical client-side communication interface of the first gateway 10 in accordance with the number of physical server-side communication interfaces of the wireless communication devices 5A and 5B. In other words, the first gateway 10 includes client-side communication interfaces whose number corresponds to the number of server-side communication interfaces of the wireless communication devices 5A and 5B. Accordingly, one physical client-side communication interface of the first gateway 10 may function as a plurality of client-side communication interfaces that correspond to the plurality of respective server-side communication interfaces of the wireless communication devices 5A and 5B. The client-side communication interface of the first gateway 10 is also referred to as a tunnel interface.

The first gateway 10 selects, from among the plurality of physical server-side communication interfaces included in the wireless communication devices 5A and 5B, a server-side communication interface whose communication state is good, and performs data communication. The first gateway 10 may transmit, to the server-side communication interfaces of the wireless communication devices 5A and 5B, communication data requiring a response, and select one of the server-side communication interfaces with the shortest response time for the communication data as the server-side communication interface whose communication state is good. Alternatively, it is possible to select the server-side communication interface whose communication state is good based on throughput using a speed test or the like, the number of transmission errors counted by a driver of a server-side interface of a wireless communication device, wait time detected by a driver of the server-side interface of the wireless communication device and the like as a result of analysis or estimation using a plurality of consecutive round-trip delay results.

The second gateway 20 is a communication control device that functions as a backup device of one or more first gateways in the communication system 1. The second gateway 20 may include a server-side communication interface and at least one client-side communication interface, just like the first gateway 10. IP addresses are allocated to the physical client-side communication interface of the second gateway 20 in accordance with the number of server-side communication interfaces of the wireless communication devices 5A and 5B. In other words, the second gateway 20 includes client-side communication interfaces whose number corresponds to the number of server-side communication interfaces of the wireless communication devices 5A and 5B. Accordingly, one physical client-side communication interface of the second gateway 20 may function as a plurality of client-side communication interfaces that correspond to the plurality of respective server-side communication interfaces of the wireless communication devices 5A and 5B. The server-side communication interface of the second gateway 20 is also referred to as a bridge interface. The client-side communication interface of the second gateway 20 is also referred to as a tunnel interface.

In this example embodiment, as identification information of the server-side communication interfaces and identification information of the client-side communication interfaces of the first gateway 10 and the second gateway 20, common virtual IP addresses in compliance with a protocol such as a Virtual Router Redundancy Protocol (VRRP) are used. The transmission of the communication data from the server 2 to the server-side communication interfaces of the first gateway 10 and the second gateway 20 is performed using the virtual IP addresses. Likewise, the transmission of the communication data from the wireless communication devices 5A and 5B to the client-side communication interfaces of the first gateway 10 and the second gateway 20 is performed using the virtual IP addresses.

The access points 4A-4C are devices that relay communication data between the first gateway 10 and the second gateway 20, and the wireless communication devices 5A and 5B.

The wireless communication devices 5A and 5B are communication devices that perform wireless communication with the first gateway 10 and the second gateway 20. Further, the wireless communication devices 5A and 5B may communicate with the mobile devices 6A and 6B via cables 40A and 40B. The wireless communication devices 5A and 5B may be installed in the mobile devices 6A and 6B. The wireless communication devices 5A and 5B may each include a plurality of physical server-side communication interfaces and one physical client-side communication interface. The wireless communication devices 5A and 5B perform communication with the first gateway 10 and the second gateway 20 via the plurality of server-side communication interfaces. Further, the wireless communication devices 5A and 5B perform communication with the mobile devices 6A and 6B via the client-side communication interface.

The mobile devices 6A and 6B are devices that are managed and/or controlled by the server 2. Specifically, the mobile devices may each be, for example, an Automatic Guided Vehicle (AGV), a machine tool, or a robot.

Figure 2:
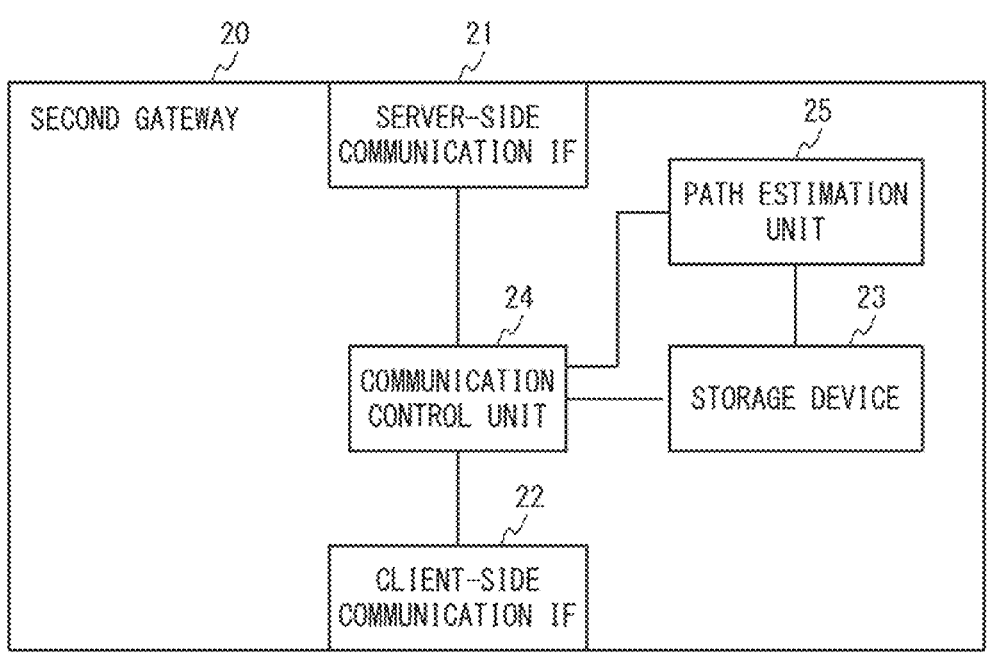
FIG. 2 is a diagram showing one example of a hardware configuration of a second gateway according to one illustrative example embodiment.

FIG. 2 is a diagram showing one example of a hardware configuration of the second gateway 20 according to one illustrative example embodiment. The second gateway 20 includes a server-side communication interface (IF) 21, a client-side communication interface 22, a storage device 23, a communication control unit 24, and a path estimation unit 25.

The server-side communication interface 21 is a communication interface used for data communication with the server 2. The client-side communication interface 22 is a communication interface that is used in data communication with the client-side device.

The storage device 23 is a device that stores various kinds of data and programs processed by the second gateway 20. The storage device 23 stores identification information of the communication interface of the device with which the first gateway 10 communicates. The identification information of the communication interface of the device with which the first gateway 10 communicates includes an IP address of the communication interface of the server 2 and IP addresses of the communication interfaces of the wireless communication devices 5A and 5B. The IP addresses of the communication interfaces of the wireless communication devices 5A and 5B may be stored in the storage device 23 in advance by user setting. When the IP addresses of the communication interfaces of the wireless communication devices 5A and 5B are dynamically generated, the storage device 23 may store Media Access Control (MAC) addresses of the communication interfaces of the wireless communication devices 5A and 5B. In this case, when the second gateway 20 receives packets from the wireless communication devices 5A and 5B and determines that MAC addresses stored in the storage device 23 match the MAC addresses added to the packets, the second gateway 20 stores the IP addresses added to the packets in the storage device 23 as the communication interface identification information of the wireless communication devices 5A and 5B.

The communication control unit 24 is a device that executes a program that will be described later. The communication control unit 24 may be implemented by a processor such as a Central Processing Unit (CPU) or a Micro Processing Unit (MPU). Further, the communication control unit 24 may also be implemented by an integrated circuit such as a Field-Programmable Gate Array (FPGA) or an Application Specific Integrated Circuit (ASIC). These devices correspond to computers.

Figure 3:
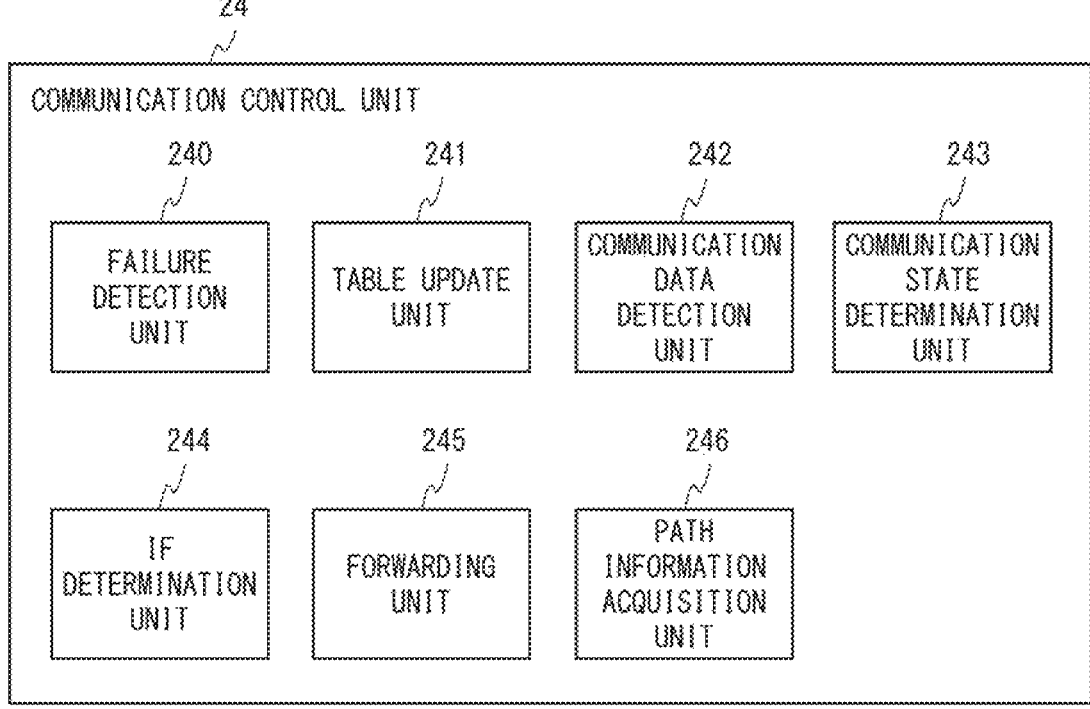
FIG. 3 is a diagram showing one example of a configuration of a communication control unit according to one illustrative example embodiment.

FIG. 3 is a diagram showing one example of a configuration of the communication control unit 24 according to one illustrative example embodiment. The communication control unit 24 executes a failure detection unit 240, a table update unit 241, a communication data detection unit 242, a communication state determination unit 243, an interface determination unit 244, a forwarding unit 245, and a path information acquisition unit 246, which are programs.

The failure detection unit 240 is a program for detecting occurrence of a failure in each of one or more first gateways 10 backed up by the second gateway 20. Specifically, the failure detection unit 240 performs alive monitoring of the first gateway 10 to be monitored. When the failure detection unit 240 detects that the first gateway 10 to be monitored has been stopped, the failure detection unit 240 transmits a packet (e.g., a Gratuitous Address Resolution Protocol (GARP) packet) indicating that the physical communication interface of the second gateway 20 uses the virtual interface identification information allocated to the first gateway 10 to the network. Another device transmits, upon receiving this packet, a packet to be transmitted to the physical communication interface identified by the virtual interface identification information allocated to the first gateway 10 to the second gateway 20. Accordingly, the second gateway 20 operates as a backup device of the first gateway 10.

The table update unit 241 is a program for updating a gateway management table for managing the first gateway 10. The table update unit 241 updates the gateway management table based on a result of alive monitoring of the first gateway 10 by the failure detection unit 240. FIG. 4 is a diagram showing one example of the gateway management table. The communication status of the first gateway 10 and the state of path information that the second gateway 20 uses when it operates as a backup device of the first gateway 10 are registered in the gateway management table in association with the identification information of each first gateway 10. The table update unit 241 changes the communication status of the first gateway 10 where occurrence of a failure has been detected to "stop" and changes the path information to "undetermined".

The communication data detection unit 242 is a program for determining whether or not the communication data has been received via the server-side communication interface 21 or the client-side communication interface 22 of the second gateway 20. In this example embodiment, a packet is employed as the communication data.

The communication state determination unit 243 is a program for determining the state of the path information registered in the gateway management table.

The interface determination unit 244 is a program for determining the interface having received the communication data.

The forwarding unit 245 is a program for forwarding the received communication data and identification information of the client-side communication interface. Specifically, the forwarding unit 245 forwards the received packet and identification information of the communication interface having received this packet to the path estimation unit 25. As will be described later, the path estimation unit 25 can update the path information using the identification information of this communication interface. Further, the forwarding unit 245 transmits a packet to the wireless communication devices 5A and 5B or the server 2 based on the path information generated by the path estimation unit 25. The forwarding unit 245 corresponds to a transmission unit.

Figure 6:
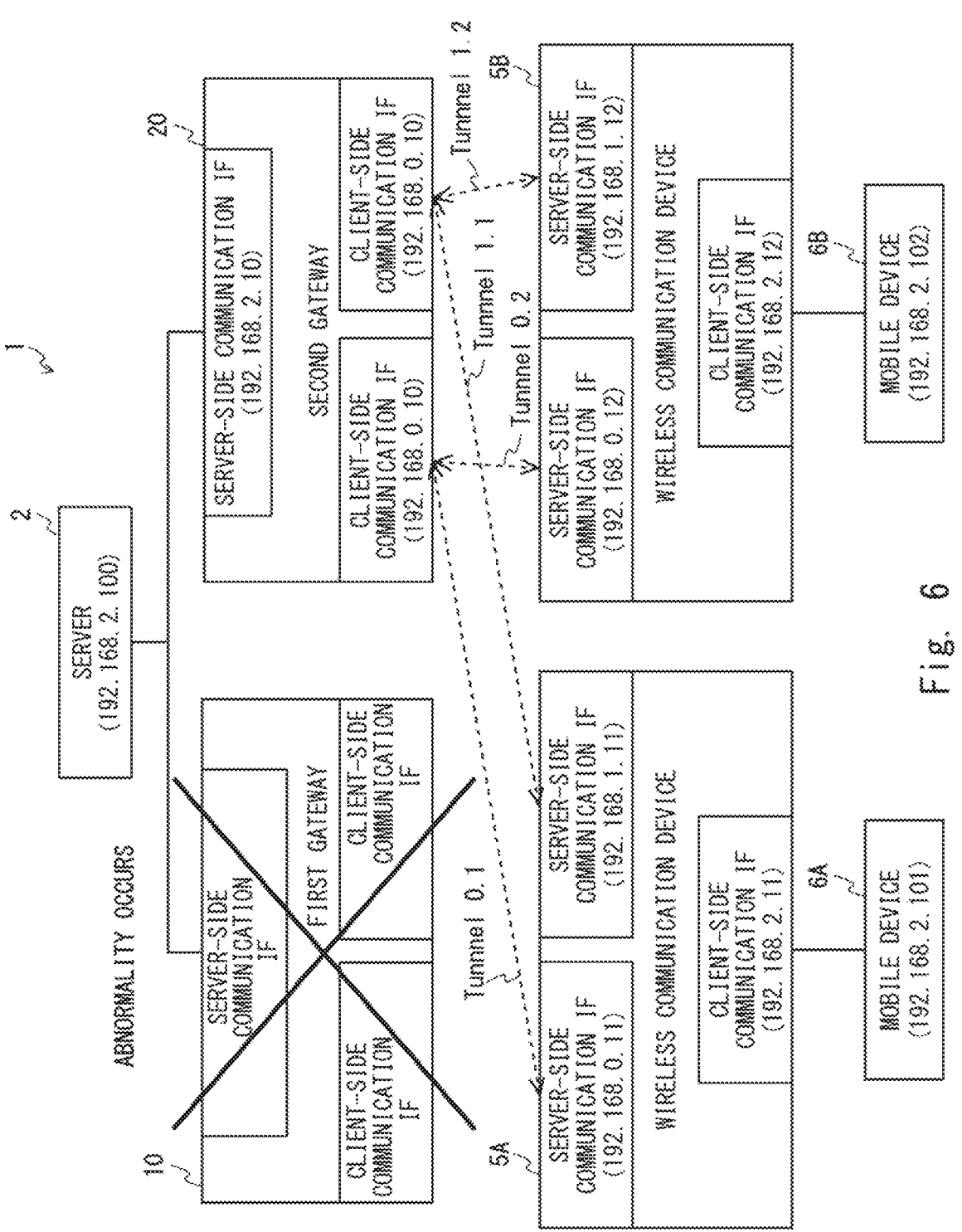
FIG. 6 is a diagram showing a communication system that corresponds to the path information table shown in FIG. 5.

The path information acquisition unit 246 is a program for referring to the path information table and acquiring the path information for forwarding the received packet. FIG. 5 is a diagram showing one example of the path information table. FIG. 6 is a diagram showing the communication system 1 that corresponds to the path information table shown in FIG. 5. The "Tunnel" shown in FIG. 6 shows a communication path between the second gateway 20 and the wireless communication devices 5A and 5B.

Identification information of the device having transmitted the packet, identification information of the device to which this packet is transmitted, identification information of an "input IF", which is a communication interface of the gateway having received the packet, and identification information of an "output IF", which is a communication interface of the gateway that transmits this packet are registered in the path information table. For example, in the path information table shown in FIG. 5, the path information identified by the number 1 is path information of the packet transmitted from the server 2 to the mobile device 6A. The input IF of the gateway is a server-side communication interface (192.168.2.10). In the communication system 1 shown in FIG. 6, there may be two output IFs of the gateway, namely, a client-side communication interface (192.168.0.10) and a client-side communication interface (192.168.1.10). Of the two client-side communication interfaces, the identification information of the client-side communication interface which has a high communication quality is registered in the path information table. When the client-side communication interface (192.168.0.10) is a client-side communication interface which has a high communication quality, as shown in the example in FIG. 5, the client-side communication interface (192.168.0.10) is registered as the output IF of the gateway.

Further, the path information identified by the number 2 is path information of a packet that is broadcast from the server 2 to the wireless communication device 5A and the wireless communication device 5B. The input IF of the gateway is a server-side communication interface (192.168.2.10). Since it is required in broadcasting that packet be delivered to both the wireless communication device 5A and the wireless communication device 5B, both the client-side communication interface (192.168.0.10) and the client-side communication interface (192.168.1.10) are registered as the output IF of the gateway.

Further, the path information identified by the number 3 is path information of the packet transmitted from the mobile device 6A to the server 2. In the communication system 1 shown in FIG. 6, there may be two input IFs of the gateway, namely, a client-side communication interface (192.168.0.10) and a client-side communication interface (192.168.1.10). The wireless communication device 5A selects the identification information of the input IF of the gateway based on the path information table stored in the storage device of the wireless communication device 5A. Note that the output IF of the gateway is a server-side communication interface (192.168.2.10).

The path estimation unit 25 is a device that executes programs that will be described later. The path estimation unit 25 may be implemented by a processor such as a CPU or an MPU. Further, the path estimation unit 25 may be implemented by an integrated circuit such as an FPGA or an ASIC. While the communication control unit 24 and the path estimation unit 25 are configured as separate devices in this example embodiment, the communication control unit 24 and the path estimation unit 25 may be configured as one device in another example embodiment.

Figure 7:
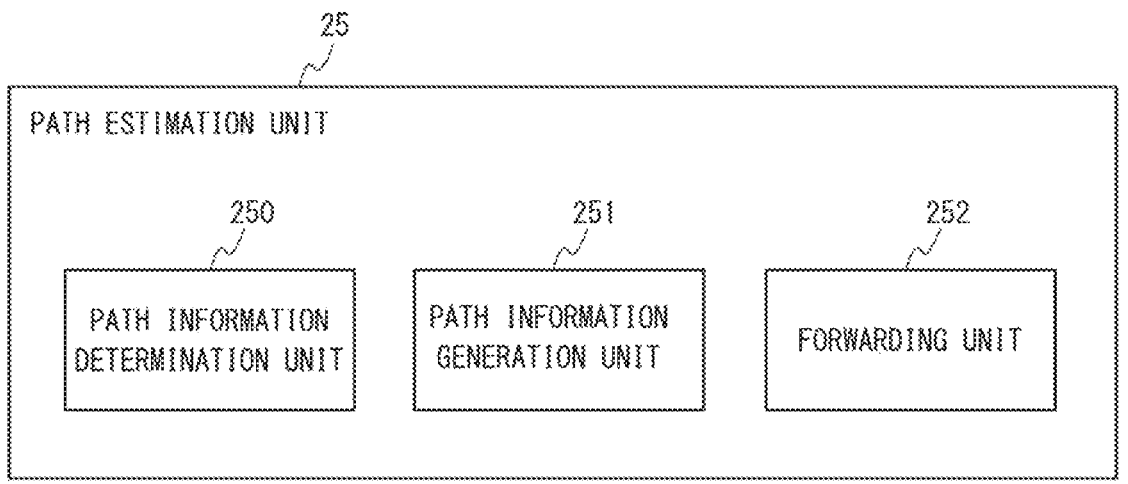
FIG. 7 is a diagram showing one example of a configuration of a path estimation unit according to one illustrative example embodiment.

FIG. 7 is a diagram showing one example of a configuration of the path estimation unit 25 according to one illustrative example embodiment. The path estimation unit 25 executes a path information determination unit 250, a path information generation unit 251, and a forwarding unit 252, which are programs.

The path information determination unit 250 is a program for determining whether or not there is path information that should be updated. Specifically, the path information determination unit 250 determines whether or not identification information of a plurality of client-side communication interfaces is registered as the output interface of the gateway of the path information of the packet to be transmitted to the mobile devices 6A and 6B. When the identification information of the plurality of client-side communication interfaces is registered as the output interface, the path information determination unit 250 determines that there is path information that should be updated. On the other hand, when identification information of one client-side communication interface is registered as the output interface, the path information determination unit 250 determines that there is no path information that should be updated.

The path information generation unit 251 is a program for generating path information that defines the communication path of the packet that the second gateway 20 has received. The path information generation unit 251 generates, for each of the packets to be sent to each device included in the communication system 1, path information at a timing when this packet is received the first time.

Specifically, the path information generation unit 251 generates path information of the packet transmitted from the second gateway 20 to the wireless communication devices 5A and 5B based on identification information of the communication interface having received packets from the wireless communication devices 5A and 5B. This packet includes a packet to be sent to the wireless communication devices 5A and 5B and a packet that passes through the wireless communication devices 5A and 5B. For example, when the second gateway 20 has received a packet from the wireless communication device 5A, the second gateway 20 registers identification information of the client-side communication interface having received this packet in the path information table as the output interface that outputs a packet to be sent to the client-side communication interface of the wireless communication device 5A or a packet that passes through this client-side communication interface.

More specifically, when, for example, the second gateway 20 has received a packet that is transmitted from the server 2 to the mobile device 6A the first time, as shown in FIG. 8, the path information generation unit 251 registers identification information of the transmission source, identification information of the destination, identification information of the server-side communication interface having received this packet, and identification information of the client-side communication interface that outputs this packet. At this time, the path information generation unit 251 registers, as identification information of the client-side communication interface that outputs this packet, both the identification information of the client-side communication interface (192.168.0.10) and the identification information of the client-side communication interface (192.168.1.10). In this case, in the second gateway 20, the packet transmitted from the server 2 to the mobile device 6A is output from both the identification information of the client-side communication interface (192.168.0.10) and the identification information of the client-side communication interface (192.168.1.10).

After that, when the second gateway 20 receives a packet transmitted from the mobile device 6A to the server 2 the first time, as shown in FIG. 8, the path information generation unit 251 registers identification information of the transmission source, identification information of the destination, identification information of the client-side communication interface having received this packet, and identification information of the server-side communication interface that outputs this packet. Then, the path information generation unit 251 updates path information of the packet transmitted from the server 2 identified by the number 1 to the mobile device 6A as shown in FIG. 8. That is, the path information generation unit 251 registers, as identification information of a communication interface that outputs a packet transmitted from the server 2 to the mobile device 6A, only the identification information of the client-side communication interface (192.168.0.10) having received the packet transmitted from the mobile device 6A to the server 2. Accordingly, the path information identified by the number 1 is determined.

The forwarding unit 245 of the communication control unit 24 forwards packets using the path information thus determined. When, for example, the second gateway 20 has received the packet to be transmitted from the server 2 to the mobile device 6A, the second gateway 20 specifies the client-side communication interface of the second gateway 20 that outputs this packet using the path information identified by the number 1. The specified client-side communication interface transmits this packet to the server-side communication interface of the wireless communication device. At this time, the specified client-side communication interface transmits a transmission target packet to the server-side communication interface of the wireless communication device having transmitted the packet used to determine the path information identified by the number 1. The information on the server-side communication interface of the wireless communication device can be stored in the storage device 23 when the path information generation unit 251 determines the path information. Alternatively, the identification information of the client-side communication interface of the second gateway 20 and the identification information of the server-side communication interfaces of the wireless communication devices 5A and 5B may be registered in the data table in advance in such a way that they are associated with each other. In this case, the specified client-side communication interface transmits the transmission target packet to the server-side communication interfaces of the wireless communication devices 5A and 5B associated with the client-side communication interface.

The forwarding unit 252 is a program for forwarding the received packet to the communication control unit 24.

Figure 9:
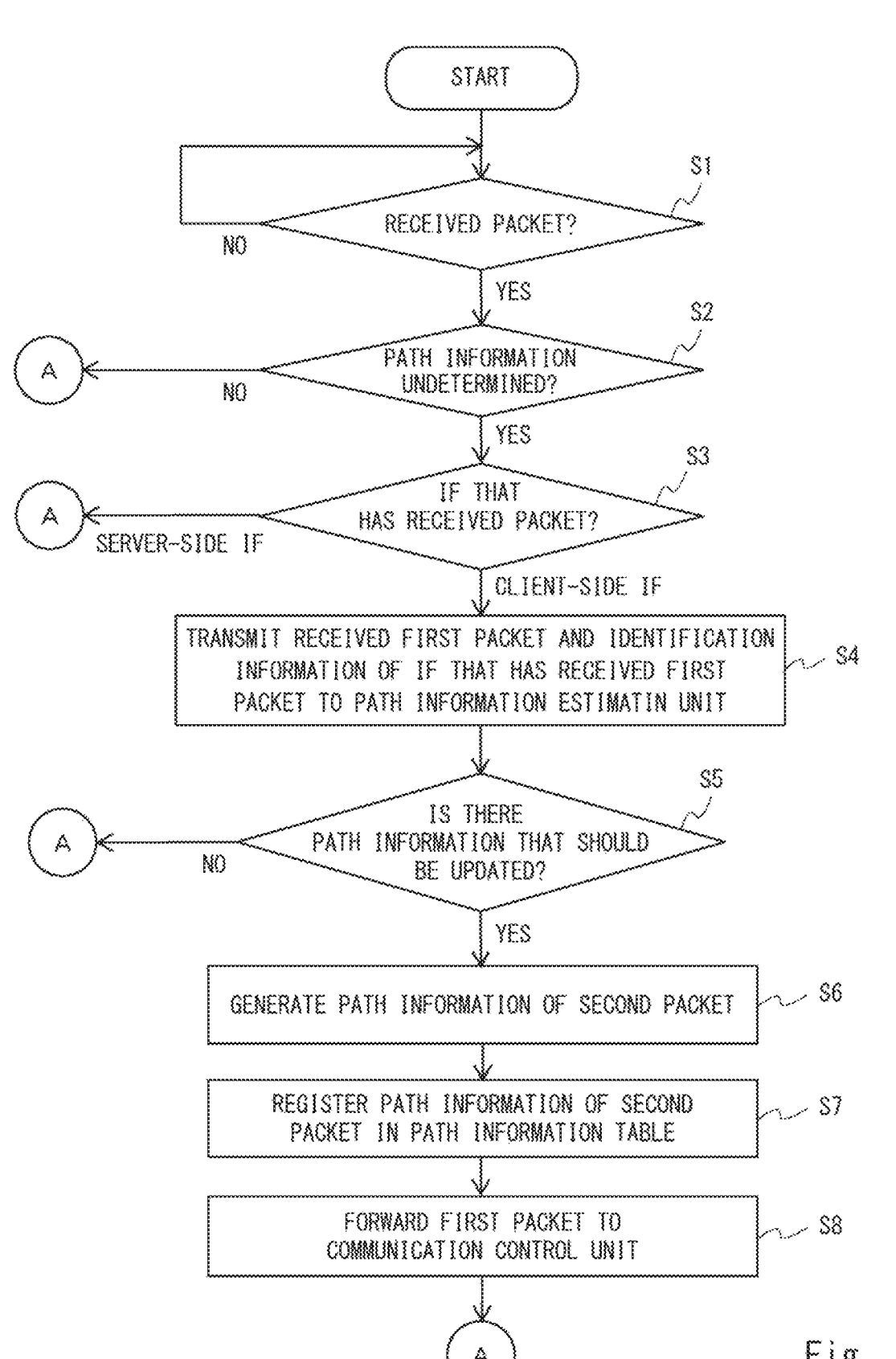
FIG. 9 is a flowchart showing processing for executing a second gateway according to one illustrative example embodiment.
Figure 10:
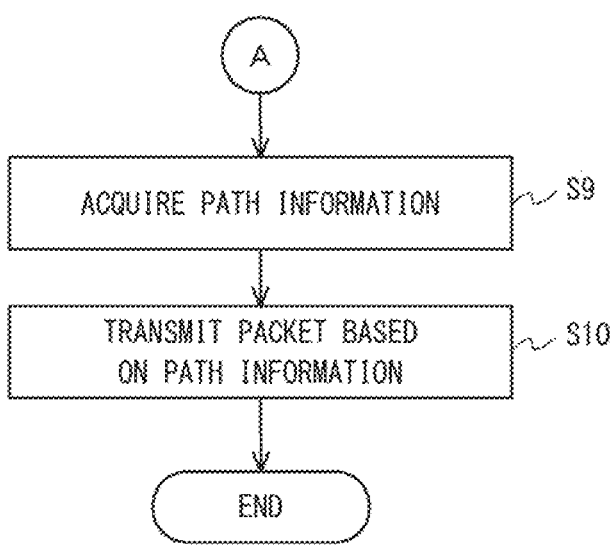
FIG. 10 is a flowchart showing processing for executing the second gateway according to one illustrative example embodiment.

FIGS. 9 and 10 are flowcharts showing processing executed by the second gateway 20 according to one illustrative example embodiment. In Step S1, the communication data detection unit 242 of the communication control unit 24 determines whether or not it has received a packet from the server-side communication interface 21 or the client-side communication interface 22 of the second gateway 20. When it has not received a packet (NO), the processing in Step S1 is executed again.

On the other hand, when a packet has been received (YES), the communication state determination unit 243 of the communication control unit 24 determines whether or not at least one of states of the path information registered in the gateway management table is undetermined in Step S2. When all the states of the path information registered in the gateway management table are determined (NO), the processing branches to Step S9. On the other hand, when at least one of the states of the path information registered in the gateway management table is undetermined (YES), the processing branches to Step S3.

In Step S3, the interface determination unit 244 of the communication control unit 24 determines the interface having received the packet. When the interface having received the packet is a server-side communication interface, the processing branches to Step S9. On the other hand, when the interface having received the packet is a client-side communication interface, the processing branches to Step S4. In Step S4, the forwarding unit 245 of the communication control unit 24 forwards the first packet received by the client-side communication interface and the identification information of the client-side communication interface having received the first packet to the path estimation unit 25.

In Step S5, the path information determination unit 250 of the path estimation unit 25 determines whether or not there is at least one path information item that should be updated. When there is no path information that should be updated (NO), the processing branches to Step S9. On the other hand, when there is path information that should be updated (YES), the processing branches to Step S6.

In Step S6, the path information generation unit 251 of the path estimation unit 25 generates path information of the second packet output from the client-side communication interface of the second gateway 20 having received the first packet. In Step S7, the path information generation unit 251 registers the generated path information in the path information table. In Step S8, the forwarding unit 252 of the path estimation unit 25 forwards the first packet to the communication control unit 24.

In Step S9, the path information acquisition unit 246 of the communication control unit 24 refers to the path information table and acquires path information for forwarding the received packet. When, for example, the path information table shown in FIG. 5 is used in a case where the transmission source of this packet is the server 2 and the destination of this packet is the mobile device 6A, the path information acquisition unit 246 acquires path information identified by the number 1 in FIG. 5. In Step S10, the forwarding unit 245 of the communication control unit 24 transmits the packet detected in Step S1 based on the acquired path information, and the processing in FIG. 10 is ended.

Figure 11:
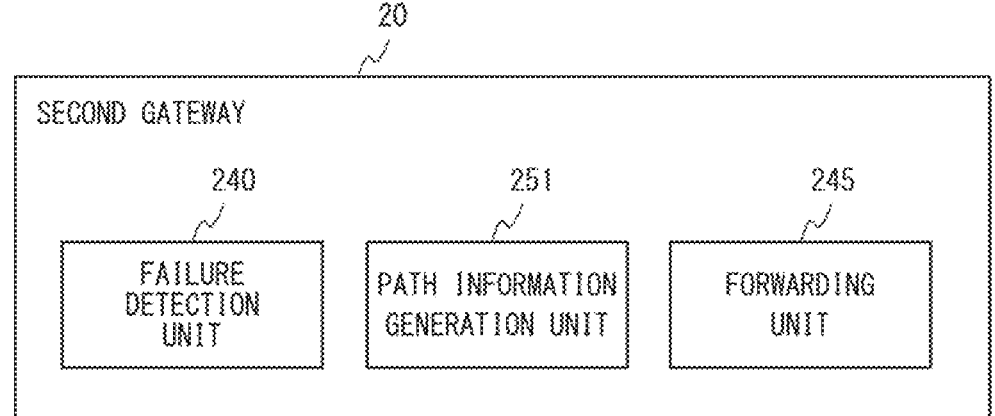
FIG. 11 is a diagram showing main components included in the second gateway according to one illustrative example embodiment.

FIG. 11 is a diagram showing main components included in the second gateway 20 according to one illustrative example embodiment. The second gateway 20 includes a failure detection unit 240, a path information generation unit 251, and a forwarding unit 245.

The failure detection unit 240 detects occurrence of a failure in the first gateway 10. When occurrence of a failure in the first gateway has been detected and the client-side communication interface of the second gateway has received first communication data from one of the plurality of server-side communication interfaces of the wireless communication device, the path information generation unit 251 generates path information that defines a communication path of the second communication data transmitted from the client-side communication interface of the second gateway having received the first communication data. The path information defines, of a plurality of client-side communication interfaces of the second gateway, the client-side communication interface having received the first communication data as an interface that transmits the second communication data. The transmission unit 245 transmits the second communication data from the client-side communication interface having received the first communication data to the server-side communication interface of the wireless communication device having transmitted the first communication data.

When the first gateway 10 performs communication by selecting one of the plurality of server-side communication interfaces included in the wireless communication devices 5A and 5B whose communication state is good, the second gateway 20 can forward the second communication data to the server-side communication interface of the wireless communication device 5A or 5B with a good communication state by employing the aforementioned configuration. Therefore, even when a failure occurs in the first gateway 10, it is possible to prevent a communication failure from occurring.

Further, the second gateway 20 includes, for each of the plurality of first gateways 10, a data table in which the path information generated by the path information generation unit 251 is registered. The path information generation unit 251 registers the IP address of the client-side communication interface of the second gateway having received the first communication data in the data table as the path information. Accordingly, the path information acquisition unit 246 can acquire, for each of the plurality of first gateways 10, the path information that defines the IP address of the client-side communication interface of the second gateway having received the first communication data. The transmission unit 245 can transmit, based on this path information, the second communication data from the client-side communication interface specified by the IP address to the server-side communication interface of the wireless communication device that corresponds to the client-side communication interface. Therefore, no matter in which one of the plurality of first gateways 10 a failure occurs, the second gateway 20 can function as a backup device of the first gateway 10 in which a failure has occurred.

In another example embodiment, the second gateway 20 may further include a transmission unit that transmits communication data requiring a response to all the server-side communication interfaces of the wireless communication devices 5A and 5B via all the client-side communication interfaces of the second gateway 20. In this case, the path information generation unit 251 specifies, for each of the plurality of client-side communication interfaces of the second gateway, one of the plurality of server-side communication interfaces of the wireless communication devices 5A and 5B with the shortest response time for communication data requiring a response. Then, the path information generation unit 251 generates path information for forwarding the second communication data to the specified server-side communication interfaces of the wireless communication devices 5A and 5B via the client-side communication interfaces of the second gateway that correspond to the specified server-side communication interfaces of the wireless communication devices 5A and 5B. Here, the client-side communication interfaces of the second gateway that correspond to the specified server-side communication interfaces of the wireless communication devices 5A and 5B are the client-side communication interfaces of the second gateway that have received the response transmitted by the server-side communication interfaces of the wireless communication devices 5A and 5B. Accordingly, even when the second gateway 20 does not receive communication data from the side of the wireless communication devices 5A and 5B, the second gateway 20 can actively specify the server-side communication interfaces of the wireless communication devices 5A and 5B whose communication state is good.

In a yet another example embodiment, when the second gateway has detected that a first gateway in which a failure has occurred has restored, the table update unit 241 can change the communication status of the first gateway 10 having been restored to "normal".

In a yet another example embodiment, when failures occur in a plurality of first gateways 10 around the same time, the second gateway 20 can operate as a backup device of these plurality of first gateways 10. In this case, the second gateway 20 can back up, according to preset backup priorities, one of the plurality of first gateways 10 whose priority is the highest.

In a yet another example embodiment, when failures occur in a plurality of first gateways 10 around the same time, the second gateway 20 can operate as a backup device of these plurality of first gateways 10 at the same time. In this case, virtual IP addresses whose number corresponds to the number of first gateways 10 are allocated to each of the server-side communication interface and the client-side communication interface of the second gateway 20. Accordingly, it is possible to multiplex the server-side communication interface and the client-side communication interface of the second gateway 20 in accordance with the number of first gateways 10 to be backed up. Each of the server-side communication interface and the client-side communication interface that have been multiplexed functions as a backup of each of the server-side communication interfaces and the client-side communication interfaces of the plurality of first gateways 10.

In the aforementioned examples, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM, CD-R, CD-R/W, and semiconductor memories (such as mask ROM, Programmable ROM (PROM), Erasable PROM (EPROM), flash ROM, RAM, etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the present disclosure has been described above with reference to the example embodiments, the present disclosure is not limited to the aforementioned example embodiments. Various changes that may be understood by one skilled in the art may be made to the configurations and the details of the present disclosure within the scope of the present disclosure. Then, each of the example embodiments may be combined with another example embodiment as necessary.

Each of the drawings or figures is merely an example to illustrate one or more example embodiments. Each figure may not be associated with only one particular example embodiment, but may be associated with one or more other example embodiments. As those of ordinary skill in the art will understand, various features or steps described with reference to any one of the figures can be combined with features or steps illustrated in one or more other figures, for example, to produce example embodiments that are not explicitly illustrated or described. Not all of the features or steps illustrated in any one of the figures to describe an example embodiment are necessarily essential, and some features or steps may be omitted. The order of the steps described in any of the figures may be changed as appropriate.

The whole or part of the example embodiments disclosed above can be described as, but not limited to, the following supplementary notes.

(Supplementary Note 1)

A communication system comprising:

at least one first gateway including a server-side communication interface and at least one client-side communication interface;

a second gateway that includes a server-side communication interface and at least one client-side communication interface and functions as a backup device of the at least one first gateway; and a plurality of communication devices that include a plurality of server-side communication interfaces and a client-side communication interface and communicate with the first gateway and the second gateway, wherein the plurality of communication devices are provided in respective mobile devices which are clients, a plurality of IP addresses are allocated to the client-side communication interfaces of the first gateway and the second gateway, which allocation allows the client-side communication interfaces to function as a plurality of client-side communication interfaces, the second gateway comprises:

at least one memory storing at least one instruction; and at least one processor configured to process the instructions to:

detect occurrence of a failure in the first gateway;

generate, when occurrence of a failure in the first gateway has been detected and the client-side communication interface of the second gateway has received first communication data from one of the plurality of server-side communication interfaces of the communication device, path information for defining a communication path of second communication data transmitted from the client-side communication interface of the second gateway having received the first communication data; and transmit, based on the path information, the second communication data from the client-side communication interface having received the first communication data to the server-side communication interface of the communication device having transmitted the first communication data, wherein the path information defines, from among the plurality of client-side communication interfaces of the second gateway, the client-side communication interface having received the first communication data as an interface that transmits the second communication data.

(Supplementary Note 2)

The communication system according to Supplementary Note 1, wherein the second gateway includes a data table in which the generated path information is registered, and the processor is configured to process the instructions to register the IP address of the client-side communication interface of the second gateway having received the first communication data in the data table as the path information.

15

(Supplementary Note 3)

The communication system according to Supplementary Note 2, wherein, in a case where the communication system includes a plurality of the first gateways, the second gateway includes the data table for each of the plurality of first gateways.

(Supplementary Note 4)

The communication system according to Supplementary Note 1, wherein the processor is configured to process the instructions to:

transmit communication data requiring a response to all the server-side communication interfaces of the communication device via all the client-side communication interfaces of the second gateway;

specify, for each of the plurality of client-side communication interfaces of the second gateway, one of the plurality of server-side communication interfaces of the communication device with the shortest response time for the communication data requiring the response; and generate path information for forwarding the second communication data to the specified server-side communication interface of the communication device via the client-side communication interface of the second gateway corresponding to the specified server-side communication interface of the communication device.

(Supplementary Note 5)

The communication system according to Supplementary Note 1, wherein, when failures occur in a plurality of first gateways around the same time, the processor is configured to process the instructions to back up one of the plurality of first gateways whose priority is the highest according to preset backup priorities.

(Supplementary Note 6)

A communication control method executed by a processor included in a communication control device that functions as a backup device of one or more gateways, wherein the communication control device comprises a server-side communication interface and at least one client-side communication interface that communicates with a plurality of communication devices provided in a plurality of respective mobile devices which are clients, a plurality of IP addresses are allocated to the client-side communication interface, which allocation allows the client-side communication interface to function as a plurality of client-side communication interfaces, the communication control method causes the processor to:

determine whether occurrence of a failure in the gateway has been detected, generate, when occurrence of a failure in the gateway has been detected and the client-side communication interface has received first communication data from one of a plurality of server-side communication interfaces included in the communication device, path information for defining a communication path of second communication data transmitted from the client-side communication interface of the communication control device having received the first communication data; and transmit, based on the path information, the second communication data from the client-side communication interface having received the first communication data to the server-side communication interface of the communication device having transmitted the first communication data, and the path information defines one of the plurality of client-side communication interfaces of the communication control device having received the first communication data as an interface that transmits the second communication data.

(Supplementary Note 7)

The communication control method according to Supplementary Note 6, wherein the second gateway includes a data table in which the generated path information is registered, and the processor registers the IP address of the client-side communication interface of the second gateway having received the first communication data in the data table as the path information.

(Supplementary Note 8)

The communication control method according to Supplementary Note 7, wherein, in a case where the communication system includes a plurality of the first gateways, the second gateway includes the data table for each of the plurality of first gateways.

(Supplementary Note 9)

The communication control method according to Supplementary Note 6, wherein the processor is configured to:

transmit communication data requiring a response to all the server-side communication interfaces of the communication device via all the client-side communication interfaces of the second gateway;

specify, for each of the plurality of client-side communication interfaces of the second gateway, one of the plurality of server-side communication interfaces of the communication device with the shortest response time for the communication data requiring the response; and generate path information for forwarding the second communication data to the specified server-side communication interface of the communication device via the client-side communication interface of the second gateway corresponding to the specified server-side communication interface of the communication device.

(Supplementary Note 10)

The communication control method according to Supplementary Note 6, wherein the processor backs up one of the plurality of first gateways whose priority is the highest according to preset backup priorities in a case in which failures occur in a plurality of first gateways around the same time.

(Supplementary Note 11)

A non-transitory computer readable storage medium storing a communication control program executed by a communication control device that functions as a backup device of one or more gateways, wherein the communication control device comprises a server-side communication interface and at least one client-side communication interface that communicates with a plurality of communication devices provided in a plurality of respective mobile devices which are clients, a plurality of IP addresses are allocated to the client-side communication interface, which allocation allows the client-side communication interface to function as a plurality of client-side communication interfaces, the program causes the processor included in the communication control device to:

determine whether occurrence of a failure in the gateway has been detected;

generate, when occurrence of a failure in the gateway has been detected and the client-side communication interface has received first communication data from one of a plurality of server-side communication interfaces included in the communication device, path information for defining a communication path of second communication data transmitted from the client-side communication interface of the communication control device having received the first communication data; and transmit, based on the path information, the second communication data from the client-side communication interface having received the first communication data to the server-side communication interface of the communication device having transmitted the first communication data, and the path information defines one of the plurality of client-side communication interfaces of the communication control device having received the first communication data as an interface that transmits the second communication data.

(Supplementary Note 12)

The non-transitory computer readable storage medium according to Supplementary Note 11, wherein the second gateway includes a data table in which the generated path information is registered, the program causing the processor to:

register the IP address of the client-side communication interface of the second gateway having received the first communication data in the data table as the path information.

(Supplementary Note 13)

The non-transitory computer readable storage medium according to Supplementary Note 12, wherein, in a case where the communication system includes a plurality of the first gateways, the second gateway includes the data table for each of the plurality of first gateways.

(Supplementary Note 14)

The non-transitory computer readable storage medium according to Supplementary Note 11, wherein the program causes the processor to:

transmit communication data requiring a response to all the server-side communication interfaces of the communication device via all the client-side communication interfaces of the second gateway;

specify, for each of the plurality of client-side communication interfaces of the second gateway, one of the plurality of server-side communication interfaces of the communication device with the shortest response time for the communication data requiring the response; and generate path information for forwarding the second communication data to the specified server-side communication interface of the communication device via the client-side communication interface of the second gateway corresponding to the specified server-side communication interface of the communication device.

(Supplementary Note 15)

The non-transitory computer readable storage medium according to Supplementary Note 11, wherein, when failures occur in a plurality of first gateways around the same time, the program causes the processor to back up one of the plurality of first gateways whose priority is the highest according to preset backup priorities.

(Supplementary Note 16)

A communication control device that functions as a backup device of one or more gateways, wherein the communication control device comprises a server-side communication interface and at least one client-side communication interface that communicates with a plurality of communication devices provided in a plurality of respective mobile devices which are clients, a plurality of IP addresses are allocated to the client-side communication interface, which allocation allows the client-side communication interface to function as a plurality of client-side communication interfaces, the communication control device comprises:

at least one memory storing at least one instruction; and at least one processor configured to process the instructions to:

detect occurrence of a failure in the gateway;

generate, when occurrence of a failure in the gateway has been detected and the client-side communication interface has received first communication data from one of a plurality of server-side communication interfaces included in the communication device, path information for defining a communication path of second communication data transmitted from the client-side communication interface of the communication control device having received the first communication data; and transmit, based on the path information, the second communication data from the client-side communication interface having received the first communication data to the server-side communication interface of the communication device having transmitted the first communication data, wherein the path information defines one of the plurality of client-side communication interfaces of the communication control device having received the first communication data as an interface that transmits the second communication data.

(Supplementary Note 17)

The communication control device according to Supplementary Note 16, wherein the communication control device includes a data table in which the generated path information is registered, and the processor is configured to process the instructions to register the IP address of the client-side communication interface of the communication control device having received the first communication data in the data table as the path information.

(Supplementary Note 18)

The communication control device according to Supplementary Note 17, wherein, in a case where a communication system includes a plurality of the gateways, the communication control device includes the data table for each of the plurality of gateways.

(Supplementary Note 19)

The communication control device according to Supplementary Note 16, wherein the processor is configured to process the instructions to:

transmit communication data requiring a response to all the server-side communication interfaces of the communication device via all the client-side communication interfaces of the communication control device;

specify, for each of the plurality of client-side communication interfaces of the communication control device, one of the plurality of server-side communication interfaces of the communication device with the shortest response time for the communication data requiring the response; and generate path information for forwarding the second communication data to the specified server-side communication interface of the communication device via the client-side communication interface of the communication control device that corresponds to the specified server-side communication interface of the communication device.

19

20

(Supplementary Note 20)

The communication control device according to Supplementary Note 16, wherein, when failures occur in a plurality of gateways around the same time, the communication control device backs up one of the plurality of gateways whose priority is the highest according to preset backup priorities.

What is claimed is:

1. A communication system comprising:

at least one first gateway including a server-side communication interface and at least one client-side communication interface;

a second gateway that includes a server-side communication interface and at least one client-side communication interface and functions as a backup device of the at least one first gateway; and a plurality of communication devices that include a plurality of server-side communication interfaces and a client-side communication interface and communicate with the first gateway and the second gateway, wherein the plurality of communication devices are provided in respective mobile devices which are clients, a plurality of IP addresses are allocated to the client-side communication interfaces of the first gateway and the second gateway, which allocation allows the client-side communication interfaces to function as a plurality of client-side communication interfaces, the second gateway comprises:

at least one memory storing at least one instruction; and at least one processor configured to process the instructions to:

detect occurrence of a failure in the first gateway;

generate, when occurrence of a failure in the first gateway has been detected and the client-side communication interface of the second gateway has received first communication data from one of the plurality of server-side communication interfaces of the communication device, path information for defining a communication path of second communication data transmitted from the client-side communication interface of the second gateway having received the first communication data; and transmit, based on the path information, the second communication data from the client-side communication interface having received the first communication data to the server-side communication interface of the communication device having transmitted the first communication data, wherein the path information defines, from among the plurality of client-side communication interfaces of the second gateway, the client-side communication interface having received the first communication data as an interface that transmits the second communication data.

2. The communication system according to claim 1, wherein the second gateway includes a data table in which the generated path information is registered, and the processor is configured to process the instructions to register the IP address of the client-side communication interface of the second gateway having received the first communication data in the data table as the path information.

3. The communication system according to claim 2, wherein, in a case where the communication system includes a plurality of the first gateways, the second gateway includes the data table for each of the plurality of first gateways.

4. The communication system according to claim 1, wherein the processor is configured to process the instructions to:

transmit communication data requiring a response to all the server-side communication interfaces of the communication device via all the client-side communication interfaces of the second gateway;

specify, for each of the plurality of client-side communication interfaces of the second gateway, one of the plurality of server-side communication interfaces of the communication device with the shortest response time for the communication data requiring the response; and generate path information for forwarding the second communication data to the specified server-side communication interface of the communication device via the client-side communication interface of the second gateway corresponding to the specified server-side communication interface of the communication device.

5. The communication system according to claim 1, wherein, when failures occur in a plurality of first gateways around the same time, the processor is configured to process the instructions to back up one of the plurality of first gateways whose priority is the highest according to preset backup priorities.

6. A communication control method executed by a processor included in a communication control device that functions as a backup device of one or more gateways, wherein the communication control device comprises a server-side communication interface and at least one client-side communication interface that communicates with a plurality of communication devices provided in a plurality of respective mobile devices which are clients, a plurality of IP addresses are allocated to the client-side communication interface, which allocation allows the client-side communication interface to function as a plurality of client-side communication interfaces, the communication control method causes the processor to:

determine whether occurrence of a failure in the gateway has been detected, generate, when occurrence of a failure in the gateway has been detected and the client-side communication interface has received first communication data from one of a plurality of server-side communication interfaces included in the communication device, path information for defining a communication path of second communication data transmitted from the client-side communication interface of the communication control device having received the first communication data; and transmit, based on the path information, the second communication data from the client-side communication interface having received the first communication data to the server-side communication interface of the communication device having transmitted the first communication data, and the path information defines one of the plurality of client-side communication interfaces of the communication control device having received the first communication data as an interface that transmits the second communication data.

7. The communication control method according to claim 6, wherein the second gateway includes a data table in which the generated path information is registered, and the processor registers the IP address of the client-side communication interface of the second gateway having received the first communication data in the data table as the path information.

8. The communication control method according to claim 7, wherein, in a case where the communication system includes a plurality of the first gateways, the second gateway includes the data table for each of the plurality of first gateways.

9. The communication control method according to claim 6, wherein the processor is configured to:

transmit communication data requiring a response to all the server-side communication interfaces of the communication device via all the client-side communication interfaces of the second gateway;

specify, for each of the plurality of client-side communication interfaces of the second gateway, one of the plurality of server-side communication interfaces of the communication device with the shortest response time for the communication data requiring the response; and generate path information for forwarding the second communication data to the specified server-side communication interface of the communication device via the client-side communication interface of the second gateway corresponding to the specified server-side communication interface of the communication device.

10. The communication control method according to claim 6, wherein the processor backs up one of the plurality of first gateways whose priority is the highest according to preset backup priorities in a case in which failures occur in a plurality of first gateways around the same time.

11. A non-transitory computer readable storage medium storing a communication control program executed by a communication control device that functions as a backup device of one or more gateways, wherein the communication control device comprises a server-side communication interface and at least one client-side communication interface that communicates with a plurality of communication devices provided in a plurality of respective mobile devices which are clients, a plurality of IP addresses are allocated to the client-side communication interface, which allocation allows the client-side communication interface to function as a plurality of client-side communication interfaces, the program causes the processor included in the communication control device to:

determine whether occurrence of a failure in the gateway has been detected;

generate, when occurrence of a failure in the gateway has been detected and the client-side communication interface has received first communication data from one of a plurality of server-side communication interfaces included in the communication device, path information for defining a communication path of second communication data transmitted from the client-side communication interface of the communication control device having received the first communication data; and transmit, based on the path information, the second communication data from the client-side communication interface having received the first communication data to the server-side communication interface of the communication device having transmitted the first communication data, and the path information defines one of the plurality of client-side communication interfaces of the communication control device having received the first communication data as an interface that transmits the second communication data.

12. The non-transitory computer readable storage medium according to claim 11, wherein the second gateway includes a data table in which the generated path information is registered, the program causing the processor to:

register the IP address of the client-side communication interface of the second gateway having received the first communication data in the data table as the path information.

13. The non-transitory computer readable storage medium according to claim 12, wherein, in a case where the communication system includes a plurality of the first gateways, the second gateway includes the data table for each of the plurality of first gateways.

14. The non-transitory computer readable storage medium according to claim 11, wherein the program causes the processor to:

transmit communication data requiring a response to all the server-side communication interfaces of the communication device via all the client-side communication interfaces of the second gateway;

specify, for each of the plurality of client-side communication interfaces of the second gateway, one of the plurality of server-side communication interfaces of the communication device with the shortest response time for the communication data requiring the response; and generate path information for forwarding the second communication data to the specified server-side communication interface of the communication device via the client-side communication interface of the second gateway corresponding to the specified server-side communication interface of the communication device.

15. The non-transitory computer readable storage medium according to claim 11, wherein, when failures occur in a plurality of first gateways around the same time, the program causes the processor to back up one of the plurality of first gateways whose priority is the highest according to preset backup priorities.

* * * * *